Patented Oct. 28, 1952

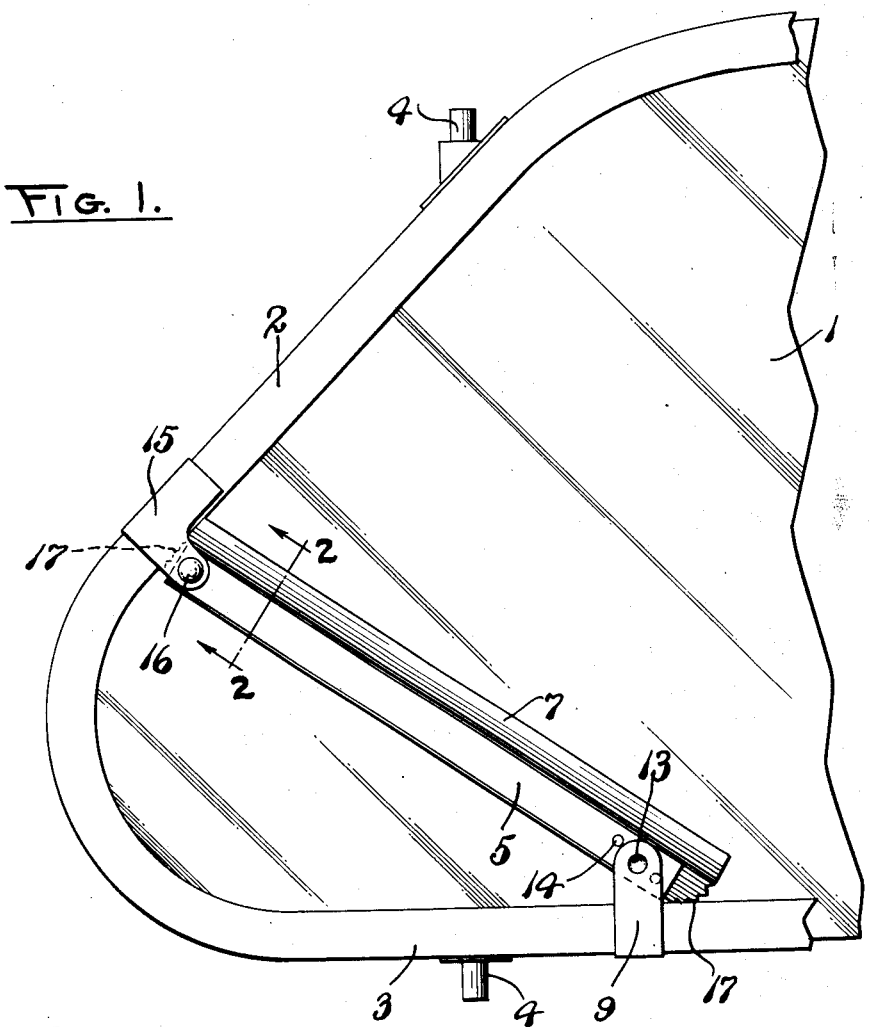
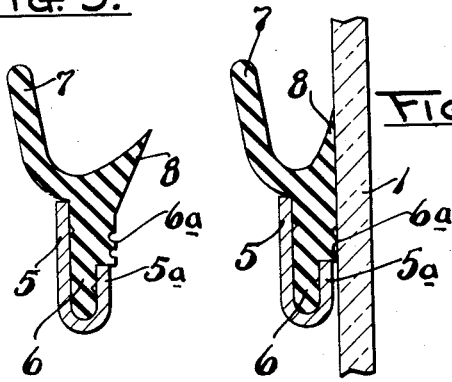
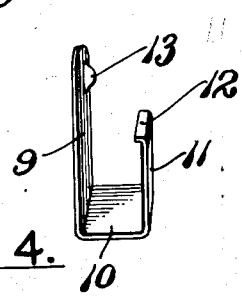

2,615,752

UNITED STATES PATENT OFFICE 2,615,752

VEHICLE VENTILATING WINDOW ANTIDRIP DEVICE

Yates M. Hoag, Utica, N. Y.

Application January 17, 1951, Serial No. 206,370

5 Claims. (Cl. 296—44)

I have heretofore obtained Letters Patent No. 2,517,205, issued August 1, 1950, for an Anti-Drip Device relating to an attachment, for quick and easy connection with the swinging parts or sections of the windows at the front of the window openings, one at each side of an automobile body, and at each end of the front or driving compartment of a motor vehicle body. Such windows or sections thereof are known as no-draft or ventilating windows, and are mounted to turn each about a vertical axis, from a closed to any one of a large number of open positions. In the closed position, the window section is in alignment with a vertically movable section of the front window back of it, and in any of the open positions, the parts of the swinging window section at the front of the vertical axis of turning extend into the automobile body.

When it rains, with the ventilating windows open to any degree, water at the outside of the window section moving downwardly and toward the front on such inwardly extended portions of the ventilated windows, drips into the body of the car.

My patent above identified provides a device or appliance attachment for directing such water, from rain which has previously dripped into the car, downwardly and back of the vertical axis of turning of the ventilated window so as to drain outside of the body of the car.

The present invention is, in general, for the same purpose but has been greatly simplified, is more easily attached and accommodates itself to all of the different shapes of the frame which carries the glass of the pivotally mounted ventilating window. By reason of such simplicity of structure, the cost is reduced with an attainment of insurance against the drip of water into the body of the automobile. Moreover the device of the present invention is less conspicuous and has a better appearance.

An understanding of the invention may be had from the following description, taken in connection with the accompanying drawing, in which, Fig. 1 is an elevation showing a ventilating window, with the anti-drip device of my invention attached thereto.

Fig. 2 is a fragmentary transverse section, enlarged, substantially on the plane of line 2—2 of Fig. 1.

Fig. 3 is a transverse section on the same plane as Fig. 2 through the anti-drip device of my invention, separated from the window, and, Fig. 4 is a perspective view of the lower end clip used in detachably securing the device to the ventilating window.

Like reference characters refer to like parts in the different figures of the drawing.

The ventilating window includes a glass panel 1 of a generally triangular form which, at its upper and lower edges and at the front, is held in a metal frame, including an upper member 2 and a lower horizontal member 3 connected by an integral bend at the front as shown. Such no-draft or ventilating window is mounted in the front portion of the front window opening to turn about a vertical axis of studs 4, mounted on the frame members 2 and 3, being received in suitable sockets therefor on the door of the automobile.

The anti-drip device of my invention includes a bar made of flat metal, which is of a general U-shape in cross section, preferably, having an outer longer leg 5 and a shorter inner leg 5a, the two legs being integrally connected by a substantially half-circular bend, as shown in Figs. 2 and 3. A sealing and gutter strip of rubber is securely connected with the described bar, having a lower section 6 secured between the legs 5 and 5a being thereby gripped or otherwise securely connected. It is of greater thickness above the shorter leg 5a and, preferably, at its inner side, immediately above the upper end of the leg 5a, having spaced grooves therein providing parallel spaced ribs 6a which extend a short distance beyond the plane of the outer side of the leg 5a.

The gutter and sealing strip also includes upwardly diverging members 7 and 8 the former extending outwardly and upwardly from immediately above the upper edge of the longer leg 5, and the latter being of progressively decreasing width from its integral connection with the section 6 until it terminates in an edge, the two converging sides of the part 8 coming together. When the metal bar with the rubber sealing member secured thereto is pressed against the outer side of the glass 1, the diverging member 7 is flexed from its angular position with reference to a vertical plane, so that its inner side is in the same plane with the inner side of the glass pane 1 against which it is securely pressed, and the projecting ribs 6a are likewise compressed making a secure seal against water passage. There is accordingly provided a gutter extending the length of such rubber strip at its upper side for the collection and flow of water which, striking against the outer side of the glass 1, and flowing downwardly will be received in such gutter and emptied therefrom at its lower end.

At the lower rear end of the metal bar, to which the gutter member is attached, a sheet metal clip is used as a means of connection to the lower frame member 3 of the window. The clip, made of flat metal, includes a vertical leg 9 adapted to be located at the outer side of the lower frame member 3 of the window, a horizontal web 10 to extend underneath and at the lower side of such frame member, and a second shorter vertical leg 11 terminating at its upper end in an outwardly turned short lip 12. The shorter leg 11 passes alongside the inner side of the frame member 3, and the lip 12 is snapped into place over the upper side of said member 3 at the inner portion thereof. A projection 13 is pressed inwardly from the vertical leg 9, or as an equivalent thereof a screw may be threaded therethrough, to project inwardly therefrom, for selective seating in any of a plurality of spaced depressions 14 which are made in the outer longer leg 5a of the metal supporting bar, near the lower end thereof.

At the upper end of the bar is a second clip 15 of the same general cross sectional structure as the lower clip, adapted to have snap engagement with the upper frame member 2. Such clip is securely connected at 16 to the upper and forward end of the outer leg 5 of the sealing strip supporting bar.

In applying the device to a ventilating window, clip 15 is snap connected with the upper frame member 2 and is adjusted to a position thereon such that the rear or lower end of the metal supporting bar comes to the upper side of the lower frame bar 3, whereupon the lower clip may be snapped into place with the projection 13 seated in a selected recess 14. The ends of the rubber gutter strip extend beyond the ends of the U-shaped metal supporting bar therefor, and are transversely ribbed with spaced serrations or ribs 17 which, in attaching the device to a window, are pressed snugly against the adjacent sides of the frame members 2 and 3 of the window and are held in such compressed position when the lower clip is secured in place, preventing water passage between the ends of the rubber strip and the frame bars 2 and 3.

Water which previously would flow downwardly and forwardly, and drip from the lower front portion of the ventilating window into the car, is received in the trough or gutter of the sealing and gutter strip, flows downwardly by gravity and escapes at the outer side of the car back of the vertical axis of the pivots 4, such lower end of the gutter strip being located outside the car.

The structure described is of a particularly simple, practical form, quickly and easily applied. It is attractive in appearance and serves the purposes for which it has been designed perfectly. It is of course to be understood that the lower clip if desired may be attached permanently at the lower or rear end of the bar 5, instead of being adjustable to different positions, and my invention is not be be restricted other than is required by the claims appended hereto which define the invention.

I claim:

1. A structure as described comprising, a bar adapted to be located at the lower front portion of a motor vehicle ventilating window, said window being adapted to be mounted to turn about a vertical axis, a yielding resilient member located at the inner side of the bar, having two diverging portions at its upper edge extending above the upper edge of the bar, the inner of said diverging portions adapted to come against the outer side of the glass of said window, attaching means one at each end of the bar adapted to have connection with the upper and lower frame members of the glass of such ventilating window the length of the bar and of said resilient member at the inner side thereof being such, that when attached to the ventilating window the rear ends of said bar and resilient member are lower than the forward ends thereof and back of the vertical axis of movement of the ventilating window to which attached, said bar having a clip at its front end adapted to have a detachable snap connected with the upper frame member of the window with which associated, and said bar at its rear portion and at its outer side having a plurality of spaced depressions therein, and a clip adapted to have detachable snap connection with the lower frame member of a window on which the bar and resilient member at the inner side thereof are mounted, and a means extending from said clip for entrance into a preselected depression in the bar.

2. In a structure as described, a relatively rigid bar, a member of resilient material at the inner side and lengthwise of said bar having diverging portions integral therewith extending above the upper edge of the bar, the inner diverging portion progressively decreasing in width outwardly to its outer edge and adapted to bear with pressure against the outer side of a motor vehicle ventilating window, and be flexed so that its inner side and the inner side of the member connected to the bar will press with snug sealing engagement against the glass of a ventilating window on which it is adapted to be mounted, means one at each end of the bar for detachably connecting said bar to the upper and lower frame members of a ventilating window, with the rear end of said bar back of the vertical axis of turning movement of said ventilating window, said bar and resilient member extending downwardly and rearwardly from their front ends, said resilient member being longer than the bar with which connected, and extending at each end beyond the adjacent end of said bar, each end of the resilient member having yielding surface projections thereon adapted to be pressed against adjacent frame members of a motor vehicle ventilating window, when attached thereto.

3. In a structure as described, a relatively rigid elongated bar, a resilient member mounted on and extending the full length of said bar permanently secured thereto, said resilient member at its upper portion having outer and inner diverging portions lengthwise thereof, detachable securing means at one end of the bar adapted to be connected to the upper and outer frame member of a motor vehicle ventilating window, and detachable attaching means adapted to be connected with the lower frame bar of a motor vehicle ventilating window, having means for connection with the opposite end of said bar, both of said means when attached to a ventilating window maintaining the inner diverging upper portion of said resilient member in snug sealing engagement against said window, said sealing member at each end extending beyond the adjacent end of said bar and having spaced transverse ribs thereon adapted to be held with pressure against adjacent frame members of a motor vehicle ventilating window.

4. The combination with an automobile window pivoted on a vertical axis of an antidrip device comprising an elongated strip of flexible material located against the outer surface of the glass of said window and having its respective ends adjacent frame members of said window respectively forwardly and rearwardly of said pivot, said flexible member having a trough in its upper edge and a lip at one side of the trough in close engagement with said glass, each end of said flexible strip having yielding surface projections thereon and detachable connecting means at each end of said flexible strip engageable with said window frame members and acting to hold said surface projections in close contact with the window frame members.

5. The elements of claim 4 in which said yielding surface projections at one end of said strip are arranged in an arcuate path.

YATES M. HOAG.

REFERENCES CITED

The following references are of record in the file of this patent:

UNITED STATES PATENTS

| Number | Name | Date |
|---|---|---|
| 2,263,860 | Schell | Nov. 25, 1941 |
| 2,499,127 | Beard | Feb. 28, 1950 |
| 2,500,991 | Kent | Mar. 21, 1950 |
| 2,517,205 | Hoag | Aug. 1, 1950 |